United States Patent
Marcolongo et al.

(10) Patent No.: US 11,267,414 B2
(45) Date of Patent: Mar. 8, 2022

(54) HOLDING DEVICE TO HOLD A TUBE OR CABLE IN ENGAGEMENT WITH A BRACKET

(71) Applicant: FCA ITALY S.p.A., Turin (IT)

(72) Inventors: Gianluca Marcolongo, Turin (IT); Adriano Aru, Turin (IT)

(73) Assignee: FCA ITALY S.p.A., Turin (IT)

( * ) Notice: Subject to any disclaimer, the term of this patent is extended or adjusted under 35 U.S.C. 154(b) by 0 days.

(21) Appl. No.: 15/930,019

(22) Filed: May 12, 2020

(65) Prior Publication Data

US 2020/0361403 A1 Nov. 19, 2020

(51) Int. Cl.
*B60R 16/02* (2006.01)
*F16L 3/10* (2006.01)
*F16M 13/02* (2006.01)
*H02G 3/32* (2006.01)

(52) U.S. Cl.
CPC ........ *B60R 16/0215* (2013.01); *F16L 3/1033* (2013.01); *F16M 13/02* (2013.01); *H02G 3/32* (2013.01)

(58) Field of Classification Search
CPC ............... B60R 16/0215; F16L 3/1033; F16L 2201/20; F16L 3/1218; F16L 3/02; F16M 13/02; H02G 3/32
USPC ......... 439/352; 174/135; 248/55, 57, 65, 73, 248/74.4, 228.8, 222.41, 225.11, 66, 56; 74/502.4, 502.6
See application file for complete search history.

(56) References Cited

U.S. PATENT DOCUMENTS

| | | | |
|---|---|---|---|
| 3,229,026 A * | 1/1966 | Robert, I | H02G 3/0616 174/664 |
| 4,518,138 A | 5/1985 | Stutenkemper et al. | |
| 5,422,436 A * | 6/1995 | Zachrai | H02B 1/305 174/152 G |
| 5,553,818 A * | 9/1996 | Wild | B60R 16/0222 248/56 |
| 5,582,199 A * | 12/1996 | Schmidt | A47L 15/42 137/343 |

(Continued)

FOREIGN PATENT DOCUMENTS

DE 102006025706 A1 12/2007
EP 3035464 A1 * 6/2016 ........... H02G 15/007

(Continued)

OTHER PUBLICATIONS

European Search Report in corresponding European Patent Application 19174228.7 dated Nov. 27, 2019.

*Primary Examiner* — Kimberly T Wood
(74) *Attorney, Agent, or Firm* — Harness, Dickey & Pierce, P.L.C.

(57) ABSTRACT

A holding device to hold a tube or cable in engagement with a bracket is provided with a structure having a seat, which is a through seat along an axis and is defined by a substantially C-shaped edge so as to have a radial opening; the structure further has a slit, which extends along a radial direction up to said seat so as to allow the bracket, in use, to be inserted into the slit and engage the seat; the holding device is further provided with a wing, which is movable between an open position, in which the seat can be accessed through the opening and a closed configuration, in which the opening is closed by the wing.

11 Claims, 5 Drawing Sheets

(56) References Cited

U.S. PATENT DOCUMENTS

| | | | | |
|---|---|---|---|---|
| 5,653,411 | A * | 8/1997 | Picco | F16L 3/2235 |
| | | | | 248/74.1 |
| 5,730,401 | A * | 3/1998 | Takeda | F16L 3/243 |
| | | | | 248/69 |
| 6,248,952 | B1 * | 6/2001 | Reeves | H02G 3/06 |
| | | | | 16/2.1 |
| 6,479,748 | B2 * | 11/2002 | Mori | B60R 16/0222 |
| | | | | 16/2.1 |
| 7,422,181 | B2 * | 9/2008 | Su | B60T 17/046 |
| | | | | 248/56 |
| 2007/0045492 | A1 * | 3/2007 | Moran | A01K 1/0356 |
| | | | | 248/222.11 |
| 2012/0217354 | A1 * | 8/2012 | Walraven | F16L 3/1025 |
| | | | | 248/74.1 |
| 2012/0292081 | A1 * | 11/2012 | Kim | B60R 16/0215 |
| | | | | 174/135 |
| 2018/0072248 | A1 | 3/2018 | Ohashi et al. | |
| 2019/0143912 | A1 * | 5/2019 | Schwiderski | B60R 16/0215 |
| | | | | 248/63 |
| 2019/0190198 | A1 * | 6/2019 | Zhang | F16C 1/26 |

FOREIGN PATENT DOCUMENTS

| | | | | |
|---|---|---|---|---|
| JP | 05231415 A | * | 9/1993 | |
| WO | WO-2020106256 A3 | * | 7/2020 | ......... B60R 16/0215 |

\* cited by examiner

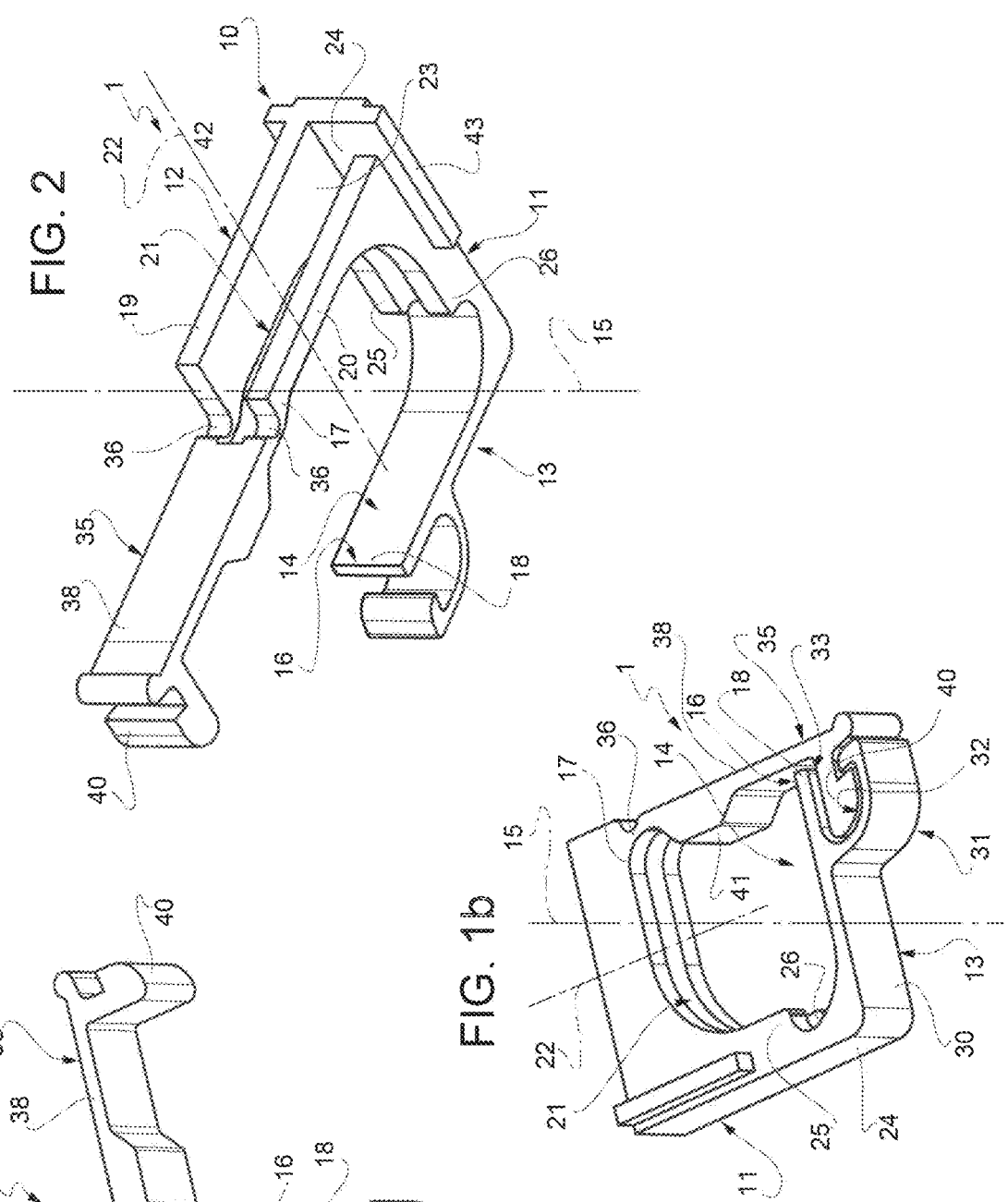

HOLDING DEVICE TO HOLD A TUBE OR CABLE IN ENGAGEMENT WITH A BRACKET

CROSS-REFERENCE TO RELATED APPLICATION

This patent application claims priority from European patent application no. 19174228.7 filed on May 13, 2019, the entire disclosure of which is incorporated herein by reference.

TECHNICAL FIELD

The invention relates to a holding device to hold a tube or a cable in engagement with a seat of a bracket, in particular in the automotive field.

In such field, tubes and cables are usually connected to support elements which, for example, are defined by plastic material clips or brackets projecting from metal parts.

BACKGROUND OF THE INVENTION

In case of support elements defined by a bracket, the latter is usually provided with a hole or a seat, which is a through passage along an axis that is orthogonal to the bracket itself, for example along a vertical axis. The perimeter of such seat is C-shaped. In other words, the bracket has an edge, which is open along a side so that an attachment portion of the tube/cable can be radially inserted into the seat. Said attachment portion elastically deforms while it enters the bracket and then goes back to its original shape after having completely engaged the seat.

In this type of fixing, the holding function is basically fulfilled by the elasticity of the aforesaid attachment portion. Due to vibrations, or also due to possible mounting imprecision, the tube/cable can slip out of the bracket. Therefore, there is a need for a holding system, which can prevent the tube/cable from slipping out of the bracket.

SUMMARY OF THE INVENTION

Therefore, the object of the invention is to provide a holding device to hold a tube or cable in engagement with a bracket, such holding device allowing users to fulfil the aforesaid need in a simple and economic manner and preferably being simple to be manufactured and fitted on the bracket.

According to the invention there is provided a holding device to hold a tube or cable in engagement with a bracket, as set forth in claim 1.

BRIEF DESCRIPTION OF THE DRAWINGS

The invention will be best understood upon perusal of the following detailed description of a preferred embodiment, which is provided by way of non-limiting example, with reference to the accompanying drawings, in which:

FIGS. 1a and 1b show in perspective, in an open configuration and in a closed configuration, respectively, a preferred embodiment of the holding device to hold a tube or a cable in engagement with a bracket, according to the invention;

FIG. 2 shows the holding device in the open configuration and according to a different perspective.

DETAILED DESCRIPTION OF THE INVENTION

Figure 3:
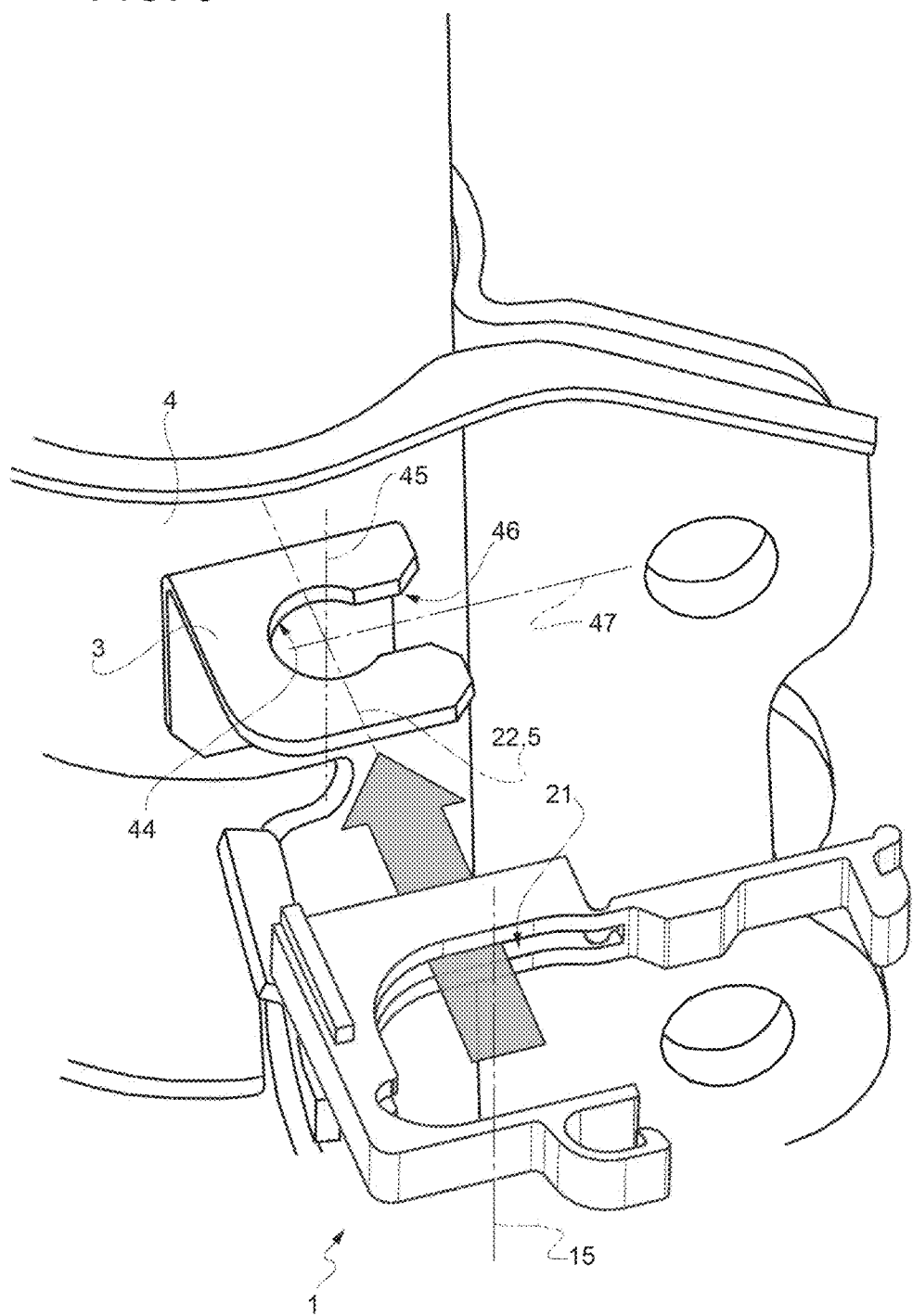
FIGS. 3 to 6 show, in perspective, a sequence of operations to be carried out in order to couple a tube or a cable to a bracket, by using the holding device according to the invention.

In FIGS. 1a, 1b and 2, reference number 1 indicates a holding device, which is preferably defined as one single piece of plastic material. As explained more in detail below and shown in FIG. 6, the device 1 is used to hold a tube or cable 2 in engagement with a bracket 3, which projects from a support wall 4 along a direction 5, which, for example, is horizontal. In particular, the device 1 can advantageously be used in the automotive field; in other words, the support wall 4 is part of a vehicle.

With reference to FIG. 1a, the device 1 comprises a structure 10 having an intermediate portion 11 and two arms 12 and 13, which extend from respective ends of the intermediate portion 11 in positions facing one another. In this way, the structure 10 defines an edge of a seat 14, which extends in a through manner along an axis 15 and has a radial opening 16 defined by ends 17 and 18 of the two arms 12 and 13. In other words, the edge of the seat 14 is substantially C-shaped ("substantially" meaning that the shape of said edge could have curvature variations and, therefore, not perfectly resemble a C).

According to FIG. 2, the arm 12 comprises two walls 19 and 20, which face one another along a direction that is parallel to the axis 15 so as to define, between them, a slit 21, which extends up to the seat 14 along a direction (which is radial relative to the axis 15) starting from an entry 23. The slit 21 preferably has a constant height, namely the walls 19 and 20 are flat and parallel to one another. In particular, in the area of the entry 23, the wall 19 projects along the direction 22 towards the outside, relative to the wall 20. More in particular, the slit 21 extends over the entire length of the arm 12, namely from the intermediate portion 11 up to the end 17.

The intermediate portion 11 comprises a wall 24, which is parallel to the axis 15 and to the direction 22 and closes, along one side, the slit 21. The intermediate portion 11 preferably comprises, furthermore, two walls 25 and 26, which project from the wall 24 and are arranged as a prolongation of the walls 19 and 20, respectively, in order to extend the slit 21 along the wall 24. Furthermore, together with the walls 19 and 20, the walls 25 and 26 define part of the edge of the seat 14.

More preferably, the walls 25 and 26 are spaced apart from the arm 13; in this way, the arm 13 is only constrained to the wall 24 and, hence, can slightly bend relative to the intermediate portion 11. With reference to FIG. 1b, in particular, the arm 13 comprises a wall 30, which is parallel to the axis 15 and transverse to the direction 22, is joined to the wall 24 and has an inner surface defining part of the edge of the seat 14. The arm 13 further comprises a hooking portion 31, which projects from an outer surface of the wall 30 and defines a hooking seat 32 having an opening 33, in the area of the end 18.

The device 1 further comprises a wing 35, which is movable relative to the structure 10 between a closed configuration (FIG. 1b), in which the radial opening 16 is closed by the wing 35, and an open configuration (FIGS. 1a and 2), in which the seat 14 can be accessed through the radial opening 16. In particular, the wing 35 is coupled, by means of a virtual hinge 36, to the end 17, so that it can rotate around an axis 37 (FIG. 1a), which is parallel to the axis 15, between the open and closed configurations due to the elastic deformation of the material in the virtual hinge 36. The wing 35 comprises a wall 38, which is parallel to the axis 37 and radially projects from the axis 37. At the end opposite to the virtual hinge 36, the wing 35 ends with a hooking tooth 40, which projects from the wall 38 and has a position, a shape and dimensions that are such as to allow it to get through the opening 33 (through elastic deformation of the tooth 40, of the wall 38 and/or of the hooking portion 31) in order to then snap into the hooking seat 32, where the tooth 40 remains locked in a releasable manner.

In particular, according to FIG. 1b, the wing 35 comprises a protuberance or projection 41, which projects from the wall 38 so as to engage part of the seat 14 in the closed configuration.

With reference to FIG. 2, the structure 10 preferably also comprises two ribs 42, 43, which project outwards from the walls 25 and 26, respectively, for example are aligned with the wall 24, and extend starting from the entry 23 over a length that is shorter than the one of the walls 25 and 26.

With reference to FIG. 3, in use, the device 1 is fitted on the bracket 3 aligning the direction 22 with the direction 5 and causing the device 1 to slide along said direction so as to insert the bracket 3 into the slit 21. The bracket 3 has a seat 44, which is a through seat along an axis 45, which, in use, is parallel to the axis 15. Similarly to the seat 14, the seat 44 also has an open perimeter, namely can be radially accessed through an entry opening 46, which is obtained along a side of the bracket 3 so as to define a radial input direction 47, which preferably is orthogonal to the direction 5.

Figure 4:
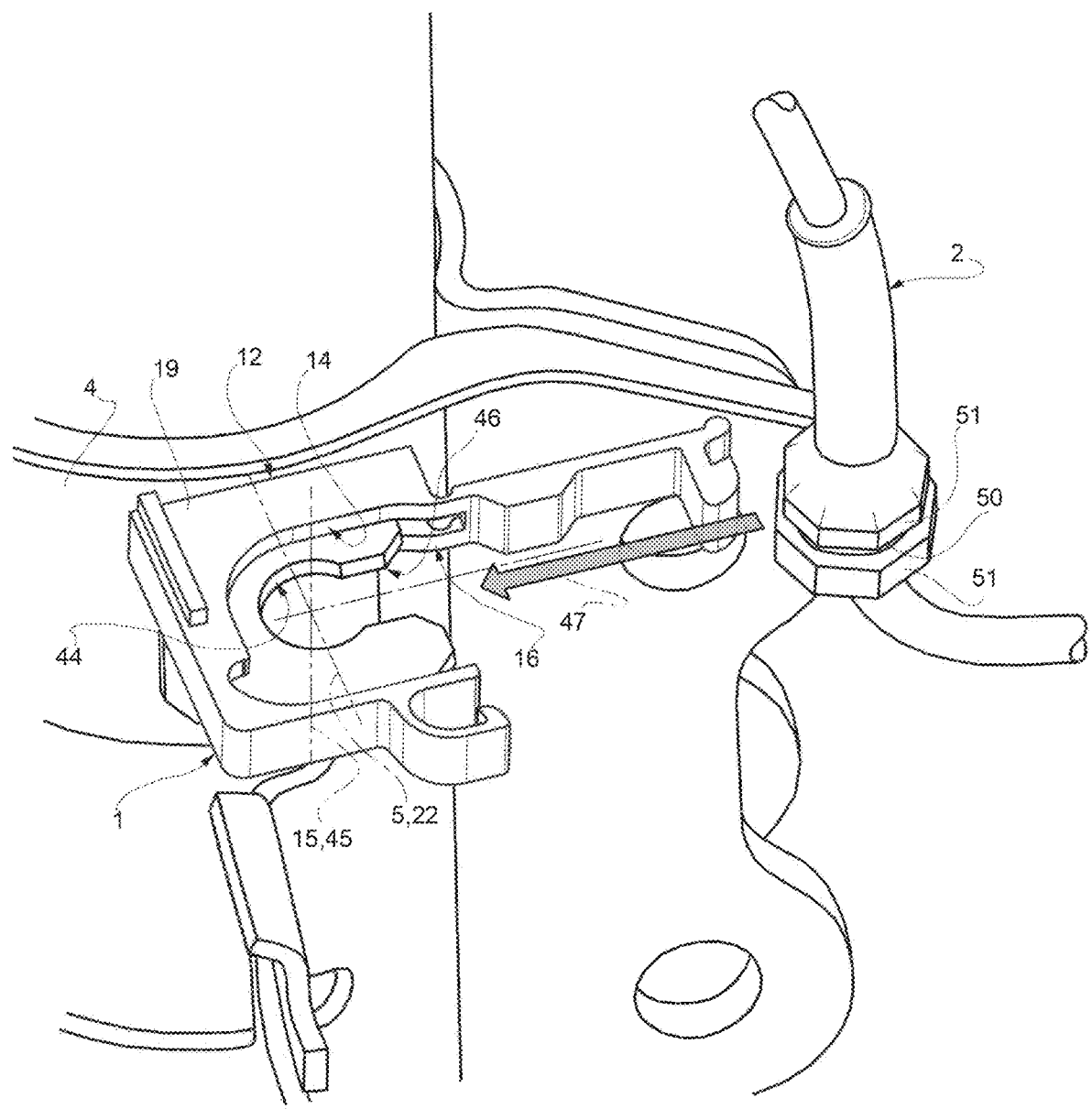

According to FIG. 4, when the device 1 is fitted on the bracket 3, the bracket 3 engages the seat 14.

In particular, the device 1 remains locked along the axis 45, since the height of the slit 21 along the axis 15 is substantially equal to the thickness of the bracket 3 along the axis 45. In other words, the walls 19 and 20, together with the walls 25 and 26, fulfil an axial holding function to axially hold the device 1, besides a guide function during the insertion of the bracket 3 into the device 1.

Furthermore, the wall 19 strikes against the wall 4. The distance of the seat 44 from the wall 4 along the direction 5 is greater than the width of the arm 12 along the direction 22, so that the arm 12 does not interfere with the seat 44. More in detail, the edge of the seat 14 surrounds the edge of the seat 44. Indeed, the opening 16 and the seat 14 are wide enough, so that the device 1 does not cover the seat 44 and the opening 46, which, hence, is completely accessible going through the opening 16 along the direction 47.

The opening 46 has a width that is smaller than the diameter of the seat 44 (in a direction that is parallel to the direction 5) so as to define a narrowing designed to elastically deform an attachment portion 50 of the cable or wire 2, when the attachment portion 50 is inserted along the direction 47 into the seat 44 through the opening 46.

Figure 5:
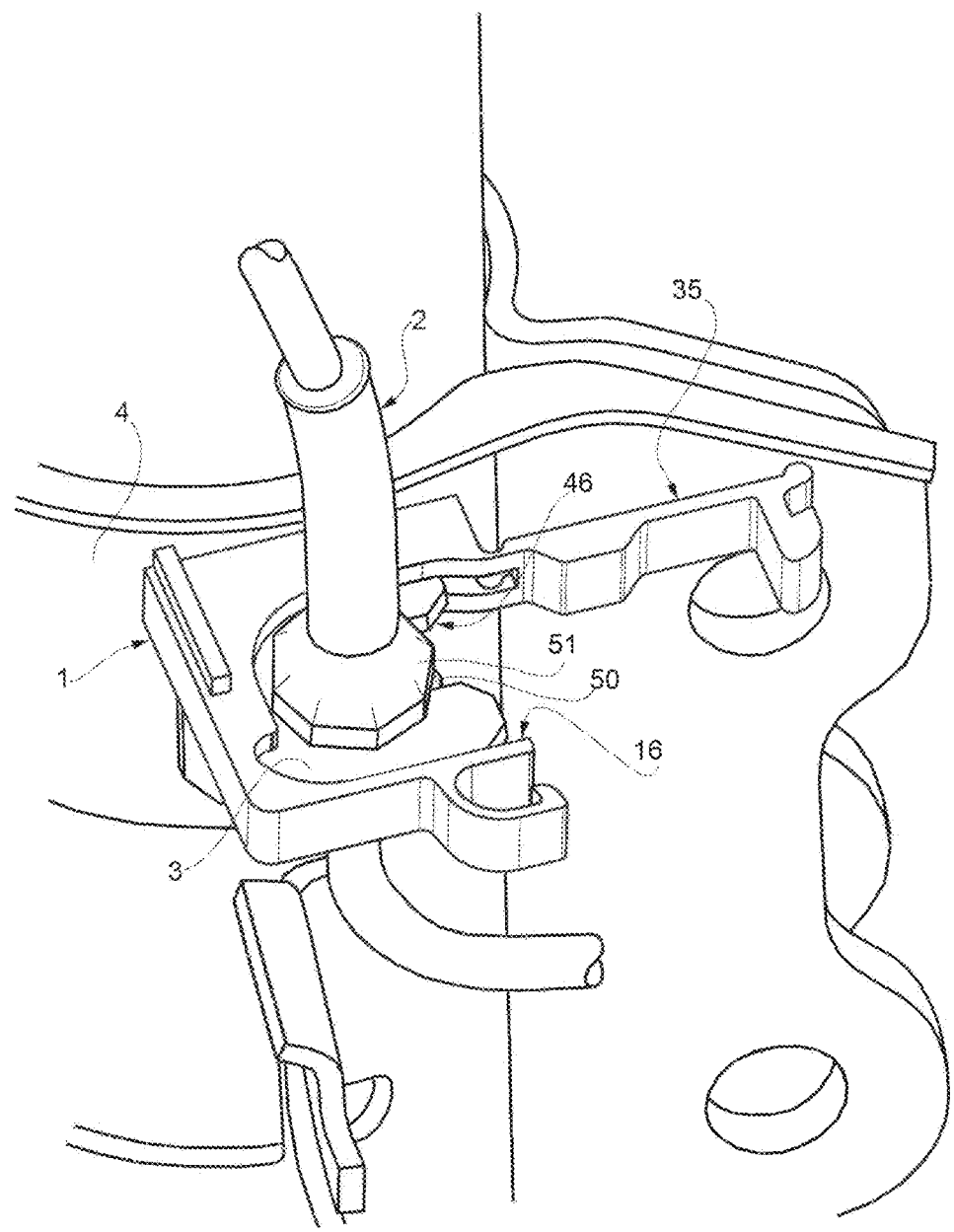

At the end of the insertion, with reference to FIG. 5, the attachment portion 50 moves past the narrowing defined by the opening 46 and, therefore, tends to go back to its original shape. In other words, the attachment portion snaps into the seat 44, basically remaining locked therein thanks to its elasticity. Furthermore, the cable or wire 2 preferably carries two flanges 51 (FIG. 4), which are arranged in opposite sides of the attachment portion 50 and, during the insertion into the seat 44, are positioned on opposite sides of the bracket 3 so as to hold the attachment portion 50 and, hence, the cable or wire 2 in a fixed position along the axis 45.

Figure 6:
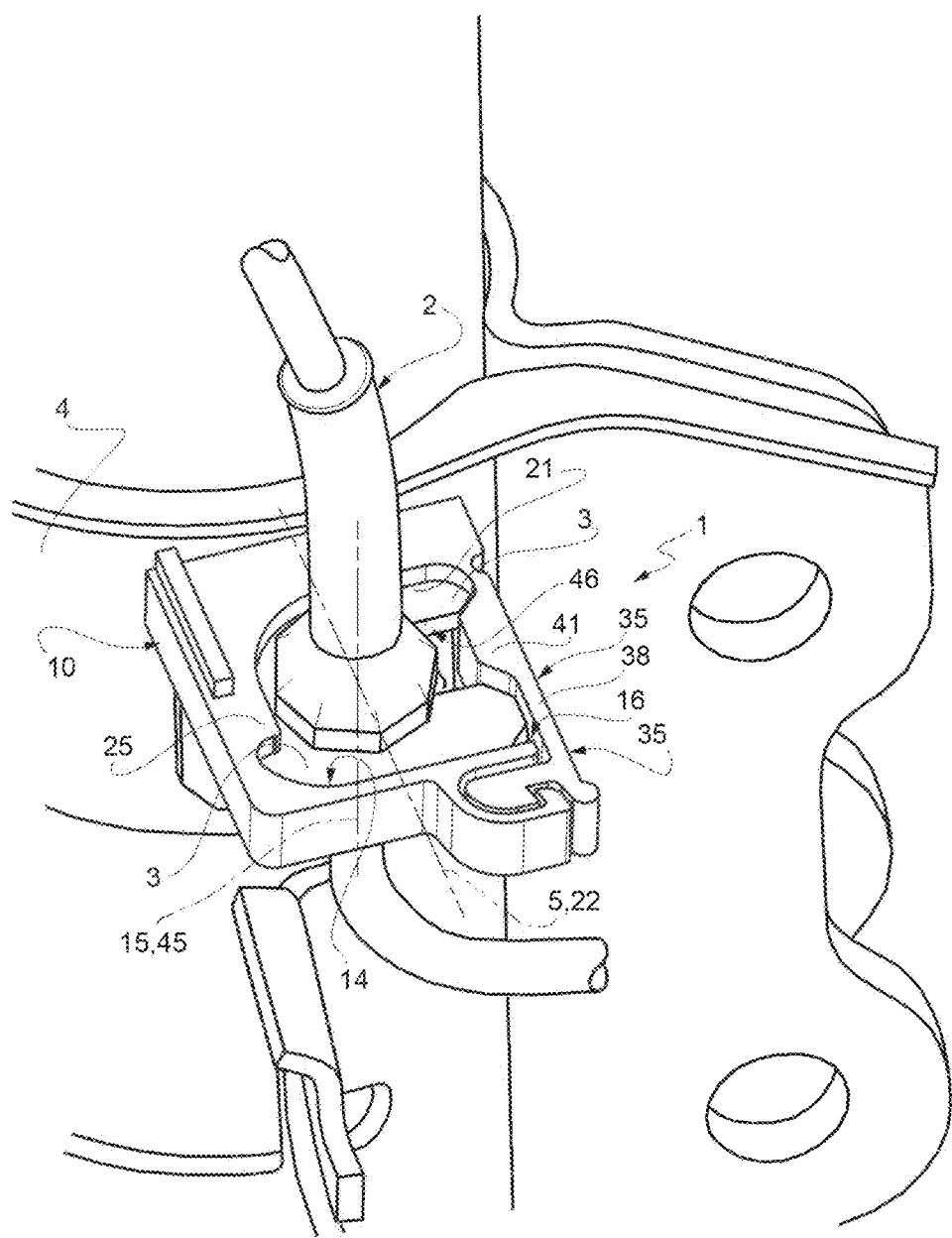

At this point, with reference to FIG. 6, the wing 35 is moved to the closed configuration and locked in said configuration by hooking the tooth 40 in the seat 32. In this way, not only the opening 16, but also the opening 46 are closed, so that the attachment portion 50 is effectively prevented from accidentally slipping out of the seat 44.

Furthermore, the protuberance 41 at least partially engages the opening 46, so as to avoid movements of the device 1 along the direction 5 relative to the bracket 3 after the closing. To this aim, the shape of the wall 38 and of the protuberance 41 preferably is complementary to the one of the side edge of the bracket 3 at the opening 46.

Owing to the above, it is evident that the device 1 manages to keep the attachment portion 50 coupled to the bracket 3, in any operating condition, for it closes the opening 46.

At the same time, the device 1 is relatively simple to be coupled to the bracket 3 and to be closed, thanks to the constructive features described above. In particular, the closing ensured by the wing 35 is reliable and can be released only when manually forced to a significant extent, so as to disengage the tooth 40 from the seat 32.

Finally, it is clear that the device 1 disclosed and shown herein can be subject to changes and variations, without for this reason going beyond the scope of protection of the invention defined in the appended claims.

In particular there could be a different fixing system, other than the seat 32 and the tooth 40, to keep the wing 35 closed; and/or the tooth 40 cold be arranged in the structure 10 and the seat 32 could be located on the wing 35. Furthermore, the wing 35 could be hinged to the arm 13 instead of being hinged to the arm 12; or it could be defined by a piece that is separate from the structure 5 and is fixed to the latter only during the closing operations.

Furthermore, the slit 21 and the relative walls 19 and could have a different shape from the one disclosed above by way of example.

Finally, the openings 16 and 46 and the wing 35 could be arranged in positions aligned with the slit 21 and with the wall 4 along the direction 22 and 5, instead of being arranged on the side as shown in the accompanying figures.

The invention claimed is:

1. A holding device to hold a tube or cable in engagement with a bracket, the device comprising:
   a structure having:
   an intermediate portion;
   a first arm extending from the intermediate portion;
   a second arm extending from the intermediate portion, the second arm is spaced apart from the first arm;
   a seat defined by the intermediate portion, the first arm, and the second arm, the seat including a substantially c-shaped edge defining a radial opening and a through passage along an axis;
   a slit defined by opposing portions of the first arm structure and extending completely through the first arm structure in a radial direction up to said seat to provide access to the through passage in a direction perpendicular to the axis, and to allow said bracket to be inserted into and through said slit and engage said seat; and a wing adjacent to the c-shaped edge and movable between an open configuration to open the radial opening so said seat can be accessed through said radial opening, and a closed configuration to close the radial opening.

2. The holding device according to claim 1, characterized in that said wing is coupled to said structure by means of a living hinge.

3. The holding device according to claim 1, characterized by being defined by one single piece of plastic material.

4. The holding device according to claim 1, characterized by comprising a hooking system to keep said wing in the closed configuration.

5. The holding device according to claim 4, characterized in that said hooking system defines a snap hooking.

6. The holding device according to claim 4, characterized in that said hooking system defines a releasable hooking.

7. The holding device according to claim 1, characterized in that said slit is defined by a first and a second wall, which are part of said structure, face one another and are spaced apart from one another along a direction that is parallel to said axis.

8. The holding device according to claim 7, characterized in that height of said slit is constant.

9. The holding device according to claim 1, characterized in that said wing comprises a third wall and a protuberance projecting from said third wall so as to engage part of said seat in the closed configuration.

10. A vehicle comprising:
a support wall;
a bracket, which projects from said support wall along a transverse direction and has a holding seat, which extends in a through manner through the bracket along a further axis and can be radially accessed through an entry opening obtained along one side of said bracket;
a cable or a wire carrying an attachment portion, which engages said holding seat; and
the holding device according to claim 1; said bracket being inserted into said slit and engaging said seat; said wing being arranged in a closed configuration so as to close said opening and said entry opening.

11. The holding device of claim 1, wherein the holding device is included with an assembly having the bracket configured to be mounted to a support wall, the bracket comprising:
a bracket seat defining an entry opening;
wherein the holding device is configured to be mounted to the bracket with the bracket extending through the slit so that the entry opening of the bracket seat is aligned with the radial opening of the holding device, such that in the open configuration the wing opens both the radial opening and the entry opening, and in the closed configuration the wing closes both the radial opening and the entry opening.

* * * * *